United States Patent
Wang

(10) Patent No.: US 9,341,228 B2
(45) Date of Patent: May 17, 2016

(54) FAN NOISE AND VIBRATION ELIMINATION SYSTEM

(71) Applicant: ASIA VITAL COMPONENTS (CHINA) CO., LTD., Shenzhen (CN)

(72) Inventor: Te-Chung Wang, Shenzhen (TW)

(73) Assignee: Asia Vital components (China) Co., Ltd., Shenzhen (CN)

(*) Notice: Subject to any disclaimer, the term of this patent is extended or adjusted under 35 U.S.C. 154(b) by 687 days.

(21) Appl. No.: 13/726,182

(22) Filed: Dec. 23, 2012

(65) Prior Publication Data
US 2014/0180484 A1    Jun. 26, 2014

(51) Int. Cl.
F16F 15/00    (2006.01)
F04D 25/08    (2006.01)
F04D 29/66    (2006.01)

(52) U.S. Cl.
CPC ............. F16F 15/002 (2013.01); F04D 25/08 (2013.01); F04D 29/665 (2013.01); F16F 15/00 (2013.01)

(58) Field of Classification Search
None
See application file for complete search history.

(56) References Cited

U.S. PATENT DOCUMENTS

| | | | |
|---|---|---|---|
| 5,370,340 A * | 12/1994 | Pla | 244/1 N |
| 5,636,287 A * | 6/1997 | Kubli et al. | 381/71.2 |
| 5,692,054 A * | 11/1997 | Parrella et al. | 381/71.3 |
| 5,791,869 A * | 8/1998 | Lee | 415/119 |
| 6,360,185 B1 * | 3/2002 | Futawatari | 702/182 |
| 7,059,820 B2 * | 6/2006 | Hosny et al. | 415/1 |
| 7,693,292 B1 * | 4/2010 | Gross et al. | 381/71.14 |
| 7,920,974 B2 * | 4/2011 | Bougaev et al. | 702/56 |
| 7,974,743 B2 * | 7/2011 | Nakashima et al. | 700/299 |
| 8,218,781 B1 * | 7/2012 | Swanke | 381/71.3 |
| 8,331,577 B2 * | 12/2012 | Lyon et al. | 381/71.5 |
| 8,504,209 B2 * | 8/2013 | Gross et al. | 700/280 |
| 8,963,466 B2 * | 2/2015 | Hopkins | 318/460 |
| 2005/0069144 A1 * | 3/2005 | Delchar et al. | 381/71.3 |
| 2006/0103334 A1 * | 5/2006 | Abali et al. | 318/67 |
| 2009/0002939 A1 * | 1/2009 | Baugh et al. | 361/687 |
| 2009/0067080 A1 * | 3/2009 | Gross et al. | 360/71 |
| 2009/0092261 A1 * | 4/2009 | Bard | 381/71.1 |
| 2009/0092262 A1 * | 4/2009 | Costa et al. | 381/71.1 |
| 2009/0129936 A1 * | 5/2009 | Yokoyama et al. | 417/16 |
| 2009/0195922 A1 * | 8/2009 | Urmanov et al. | 360/97.02 |
| 2010/0002385 A1 * | 1/2010 | Lyon et al. | 361/695 |
| 2010/0310083 A1 * | 12/2010 | Sonnde | 381/71.1 |
| 2011/0051357 A1 * | 3/2011 | Orr et al. | 361/679.48 |
| 2011/0255704 A1 * | 10/2011 | Hopkins | 381/71.3 |
| 2012/0017856 A1 * | 1/2012 | Nicgorski | 123/41.11 |
| 2013/0037620 A1 * | 2/2013 | Aryanfar et al. | 236/49.3 |

* cited by examiner

Primary Examiner — Christopher E Everett
(74) Attorney, Agent, or Firm — C. G. Mersereau; Nikolai & Mersereau, P.A.

(57) ABSTRACT

A fan noise and vibration elimination system includes a sound wave sensor, a vibration sensor, a computing controller, a sound wave generator and a vibration generator. The sound wave sensor and the vibration sensor respectively receive noise and vibration produced by a fan during operation thereof to generate corresponding sound wave detection signal and vibration detection signal to the computing controller. Based on the received sound wave detection signal and vibration detection signal, the computing controller generates a sound wave cancel-out signal and a vibration cancel-out signal to the sound wave generator and the vibration generator, respectively, for the latter to generate a phase-inverted sound wave and a reverse vibration frequency to cancel the noise and the vibration produced by the operating fan.

7 Claims, 2 Drawing Sheets

FAN NOISE AND VIBRATION ELIMINATION SYSTEM

FIELD OF THE INVENTION

The present invention relates to a noise and vibration elimination system, and more particularly to a fan noise and vibration elimination system for eliminating noise and vibration produced by a fan during operation thereof.

BACKGROUND OF THE INVENTION

Due to rapid developments in the information technological field, various types of electronic products, such as computers, have become prerequisite tools and play very important roles in people's life and work. To provide constantly upgraded operational performance, electronic elements, such as the central processing unit (CPU), in a computer would consume highly increased power, which leads to a high thermal effect on the computer. Raised temperature inside the computer would cause drifting in the work curve of the computer and accordingly unstable operation of the internal electronic elements thereof, which tends to cause error operation of the computer or even a crashed computer and burned out electronic elements. Therefore, heat dissipation of computer has long been a tough problem to be solved in the computer-related fields. Currently, the cooling fan is indispensable in a computer system for removing heat from electronic elements to ensure stable operation of the computer. While the cooling fan helps to solve the problem of heat dissipation in computer, it produces annoying noise and vibration during operation thereof. Such noise might occur during high-speed operation of the fan or due to vibration between parts of the fan, and is hard to avoid even if the best possible measures for balancing the fan has been taken.

Fan manufacturers pay high attention to the problem of noise because people tend to become restless and anxious or have lowered working performance or even subject to mental and physical impairments in an environment full of noise. Therefore, the effective elimination of noise is not only meaningful to the academic field, but also very practical to the industrial field as well as to the improvement of people's daily life. Currently, most ways for suppressing fan noise direct to the improvements in fan parts design, such as the shape of fan frame, the shape of fan blades, the stator blades, ribs and the like. However, noise tends to occur after the fan with the above changes has operated over a period of time. Further, the fan with changes in design usually produces more operational noise and vibration-caused noise and requires increased manufacturing cost if the design changes have to satisfy the requirement for heat dissipation at the same time.

In brief, the conventional noise control ways have the following disadvantages: (1) the change in fan design or the improvement in fan material does not effectively solve the problem of noise and simply increases the fan assembling cost; (2) the additionally provided fan parts would result in early occurrence of fan resonant frequency and more serious vibration-caused noise; and (3) the noise occurs under high-speed fan operation even if balancing measures have been taken for the fan.

It is therefore tried by the inventor to develop an improved fan noise and vibration elimination system to solve the problems and drawbacks in the conventional ways for controlling fan noise and vibration.

SUMMARY OF THE INVENTION

A primary object of the present invention is to provide a fan noise and vibration elimination system for eliminating noise and vibration produced by a fan during operation thereof.

Another object of the present invention is to provide a fan noise and vibration elimination system that is set to eliminate noise and vibration of an operating fan directly according to a rotational speed of the fan.

A further object of the present invention is to provide a fan noise and vibration elimination system that eliminates noise and vibration of an operating fan without causing increased fan assembling cost.

To achieve the above and other objects, the fan noise and vibration elimination system according to the present invention is applicable to a fan and includes a sound wave sensor, a vibration sensor, a computing controller, a sound wave generator and a vibration generator. The sound wave sensor is arranged in the fan for receiving noise produced by the fan during operation thereof and correspondingly generating a sound wave detection signal. The vibration sensor is also arranged in the fan for detecting vibration produced by the fan during operation thereof and correspondingly generating a vibration detection signal. The computing controller is electrically connected to the sound wave sensor and the vibration sensor for receiving the sound wave detection signal and the vibration detection signal and correspondingly generating a sound wave cancel-out signal and a vibration cancel-out signal. The sound wave generator is electrically connected to the computing controller for receiving the sound wave cancel-out signal and correspondingly generating a phase-inverted sound wave for canceling the noise produced by the fan. The vibration generator is electrically connected to the computing controller for receiving the vibration cancel-out signal and correspondingly generating a reverse vibration frequency for canceling the vibration produced by the fan. With these arrangements, the noise and vibration produced by the operating fan as well as any vibration-caused noise can be eliminated without causing increased fan assembling cost.

In conclusion, the present invention has the following advantages: (1) effectively eliminates the noise produced by an operating fan; (2) effectively eliminates the vibration produced by an operating fan and any vibration-caused noise; and (3) reduces the costs for assembling fan and eliminating fan noise and vibration.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
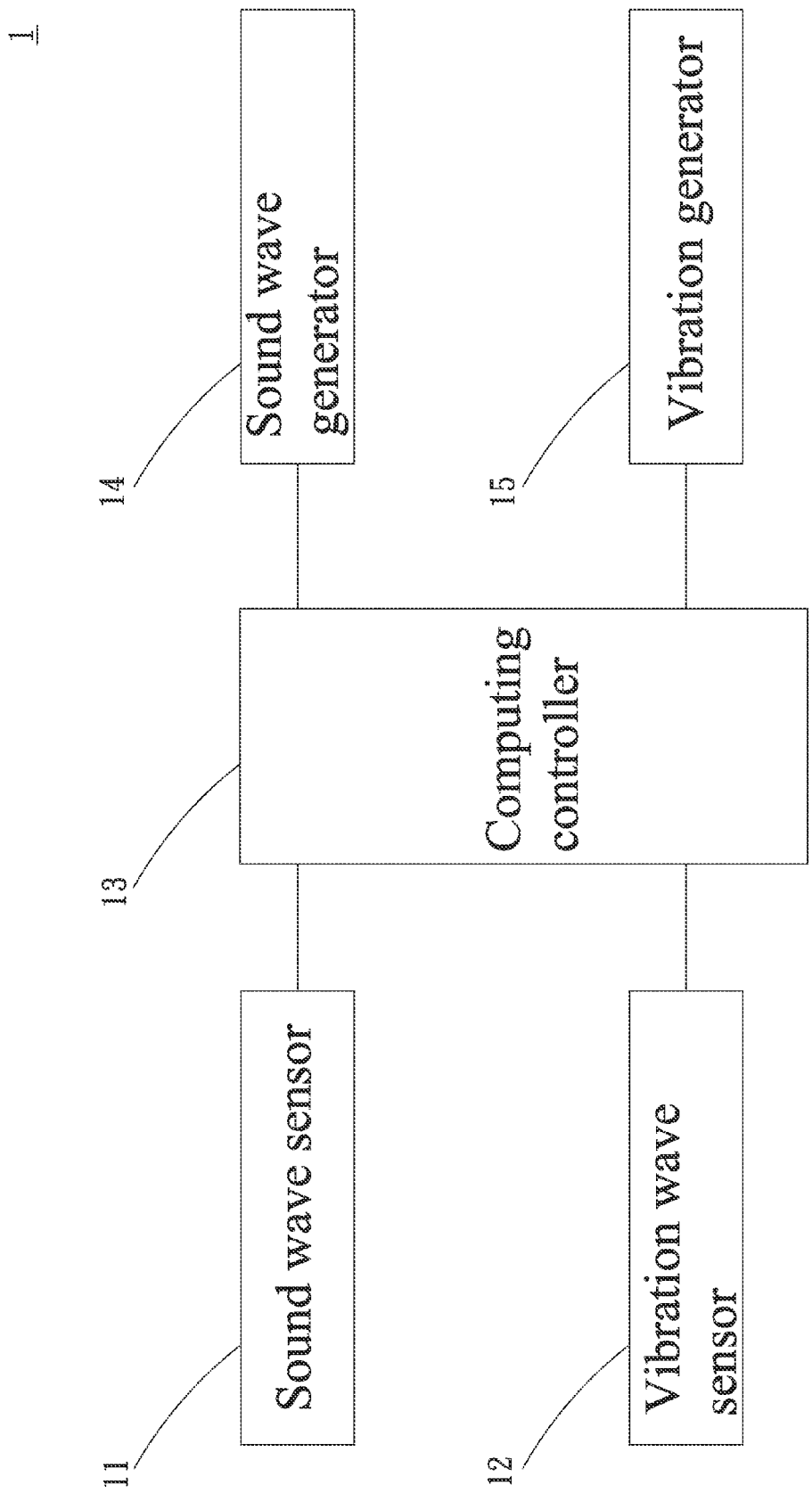
FIG. 1 is a block diagram of a fan noise and vibration elimination system according to a first embodiment of the present invention.

The present invention will now be described with some preferred embodiments thereof and with reference to the accompanying drawings. For the purpose of easy to understand, elements that are the same in the preferred embodiments are denoted by the same reference numerals.

Please refer to FIG. 1 that is a block diagram of a fan noise and vibration elimination system 1 according to a first embodiment of the present invention applied to a control circuit (not shown) of a fan. As shown, the fan noise and vibration elimination system 1 in the first embodiment includes a sound wave sensor 11, a vibration sensor 12, a computing controller 13, a sound wave generator 14, and a vibration generator 15.

The sound wave sensor 11 can be a microphone and is arranged in a fan at a position corresponding to a noise source for receiving a sound wave of noise generated by the noise source during operation of the fan and correspondingly generating a sound wave detection signal. The vibration sensor 12 can be an accelerometer and is arranged in the fan at a position corresponding to a vibration source for receiving a frequency of vibration generated by the vibration source during operation of the fan and correspondingly generating a vibration detection signal.

The computing controller 13 is electrically connected to the sound wave sensor 11 and the vibration sensor 12 for receiving the sound wave detection signal and the vibration detection signal. The computing controller 13 computes the sound wave of the generated noise and the frequency of the generated vibration to generate a sound wave cancel-out signal and a vibration cancel-out signal, respectively. The computing controller 13 is also electrically connected to the sound wave generator 14 and the vibration generator 15. The sound wave generator 14 receives the sound wave cancel-out signal and correspondingly generates a phase-inverted sound wave capable of canceling the noise in the fan, so that the sound wave of the noise generated by the noise source in the fan and the phase-inverted sound wave generated by the sound wave generator 14 cancel each other out to achieve a noise suppression effect. The vibration generator 15 receives the vibration cancel-out signal and correspondingly generates a reverse vibration frequency capable of canceling the frequency of vibration generated in the fan, so that the vibration generated by the vibration source in the fan and the reverse frequency generated by the vibration generator 15 cancel each other out to achieve a vibration suppression effect. In the illustrated first embodiment, the sound wave generator and the vibration generator are a speaker and a vibration meter, respectively. Thus, the fan noise and vibration elimination system 1 according to the first embodiment of the present invention can eliminate the noise and vibration generated during fan operation as well as any vibration-caused noise without causing increased fan assembling cost. Further, in the present invention, the sound wave sensor 11, the vibration sensor 12, the computing controller 13, the sound wave generator 14 and the vibration generator 15 are electrically connected to a control circuit provided in the fan.

Figure 2:
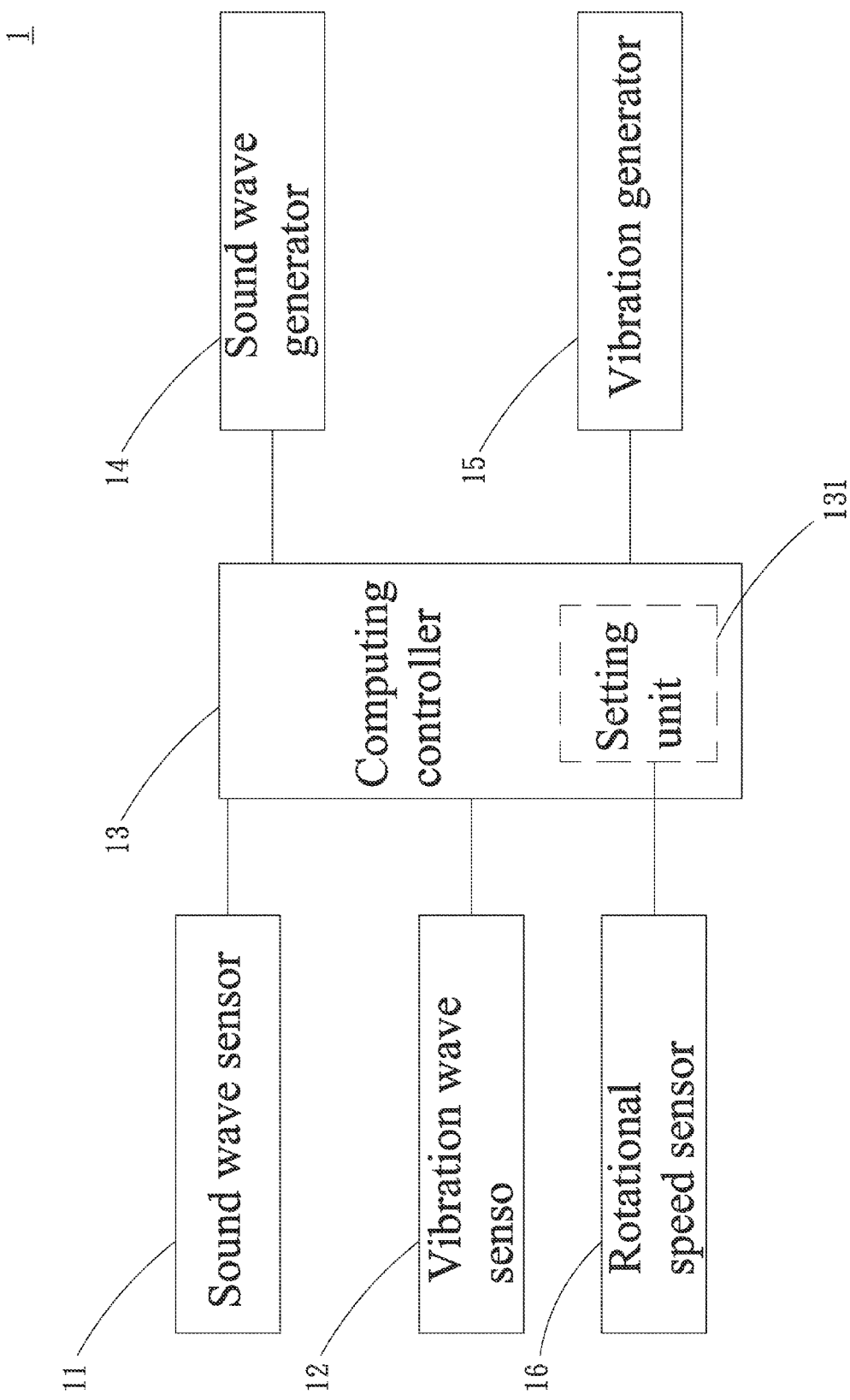
FIG. 2 is a block diagram of a fan noise and vibration elimination system according to a second embodiment of the present invention.

FIG. 2 is a block diagram of a fan noise and vibration elimination system 1 according to a second embodiment of the present invention. As shown, the second embodiment is generally structurally similar to the first embodiment but further includes a rotational speed sensor 16 and a setting unit 131. The rotational speed sensor 16 is electrically connected to the computing controller 13 and is able to detect a rotational speed of the fan and correspondingly generate a rotational speed detection signal. The setting unit 131 is included in the computing controller 13 corresponding to the rotational speed sensor 16. Since the noise and the vibration generated by the noise source and the vibration source in the fan, respectively, vary with the rotational speeds of the fan, different rotational speed data are first defined in the setting unit 131 according to the noise and the vibration generated by the noise source and the vibration source at different fan rotational speeds. These rotational speed data also correspond to the sound wave cancel-out signal and the vibration cancel-out signal. When the fan operates, the rotational speed sensor 16 detects the fan rotational speed and generates a corresponding rotational speed detection signal to the computing controller 13, which receives the rotational speed detection signal and controls the setting unit 131 to output a corresponding rotational speed data. Based on the output rotational speed data, the computing controller 13 generates corresponding sound wave cancel-out signal and vibration cancel-out signal. Thus, the fan noise and vibration elimination system 1 according to the second embodiment of the present invention can also eliminate the noise and vibration generated during fan operation as well as any vibration-caused noise without causing increased fan assembling cost.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A fan noise and vibration elimination system applied to a fan, comprising:
   a sound wave sensor being arranged in the fan for receiving noise produced by the fan during operation thereof and correspondingly generating a sound wave detection signal;
   a vibration sensor being arranged in the fan for detecting vibration produced by the fan during operation thereof and correspondingly generating a vibration detection signal;
   a computing controller internally including a setting unit and being electrically connected to the sound wave sensor and the vibration sensor for receiving the sound wave detection signal and the vibration detection signal, the setting unit internally defining a plurality of rotational speed data corresponding to the noise and vibration produced by the fan at different fan rotational speeds, the computer controller correspondingly generating a sound wave cancel-out signal and a vibration cancel-out signal according to the sound wave detection signal, the vibration detection signal and the rotational speed data;
   a sound wave generator being electrically connected to the computing controller for receiving the sound wave cancel-out signal and correspondingly generating a phase-inverted sound wave for canceling the noise produced by the fan; and
   a vibration generator being electrically connected to the computing controller for receiving the vibration cancel-out signal and correspondingly generating a reverse vibration frequency for canceling the vibration produced by the fan.

2. The fan noise and vibration elimination system as claimed in claim 1, further comprising a rotational speed sensor for detecting a rotational speed of the fan and correspondingly generating a rotational speed detection signal.

3. The fan noise and vibration elimination system as claimed in claim 2, wherein the setting unit outputs one of the rotational speed data according to the rotational speed detection signal, and the computing controller generating the sound wave cancel-out signal and the vibration cancel-out signal according to the rotational speed data output by the setting unit.

4. The fan noise and vibration elimination system as claimed in claim 1, wherein the sound wave sensor is a microphone.

5. The fan noise and vibration elimination system as claimed in claim 1, wherein the vibration sensor is an accelerometer.

6. The fan noise and vibration elimination system as claimed in claim 1, wherein the sound wave generator is a speaker.

7. The fan noise and vibration elimination system as claimed in claim 1, wherein the fan is internally provided with a control circuit; and the sound wave sensor, the vibration sensor, the computing controller, the sound wave generator and the vibration generator being provided on and electrically connected to the control circuit.

* * * * *